R. B. LEWIS.
KETTLE.
APPLICATION FILED NOV. 29, 1907.

908,285.

Patented Dec. 29, 1908.

Witnesses
Hugo P. Donch
Irving K. King

Inventor
Robert B. Lewis,
By Victor J. Evans.
Attorney

UNITED STATES PATENT OFFICE.

ROBERT B. LEWIS, OF GREENFORD, OHIO.

KETTLE.

No. 908,285.     Specification of Letters Patent.     Patented Dec. 29, 1908.

Application filed November 29, 1907. Serial No. 404,466.

*To all whom it may concern:*

Be it known that I, ROBERT B. LEWIS, a citizen of the United States of America, residing at Greenford, in the county of Mahoning and State of Ohio, have invented new and useful Improvements in Kettles, of which the following is a specification.

This invention relates to kettles and other analogous vessels.

The object of the invention is to provide a novel kettle having an opening in the top offset from the center thereof and adjacent the front edge of the body portion, facilitating means for preventing persons from burning their hands when the kettle is in operation.

A further object of the invention is to provide a handle of the construction shown, facilitating a better gripping means when it is desired to pour water from the vessel.

A still further object of the invention is to provide a novel device of this character wherein means are provided for holding the handle in an erect position and in a horizontal position on the kettle.

Furthermore, it is an object of the invention to provide a novel device of this character that is simple in construction, efficient in practice and economical to manufacture.

With these objects in view and others, as will appear as the description proceeds, the invention comprises the various novel features which will be hereinafter more fully described and set forth with particularity in the claims appended hereto.

Figure 1:
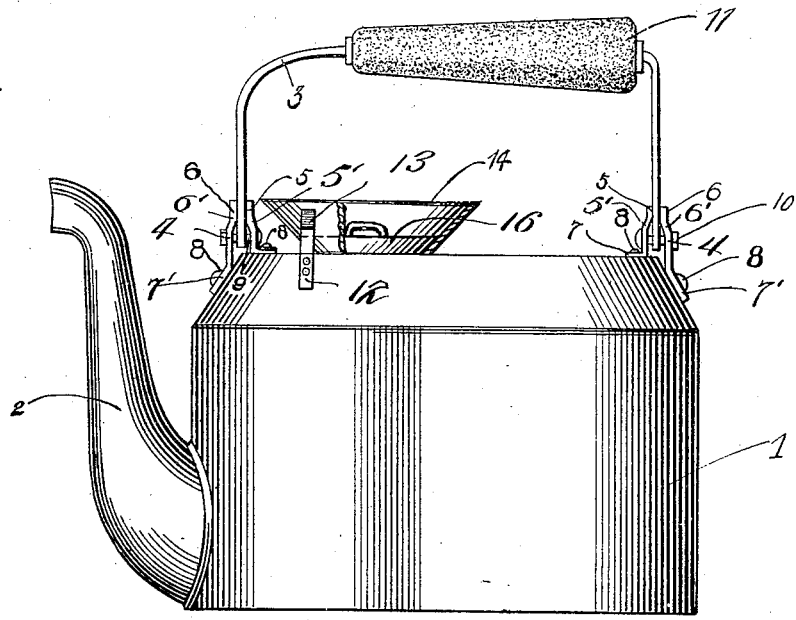
Figure 2:
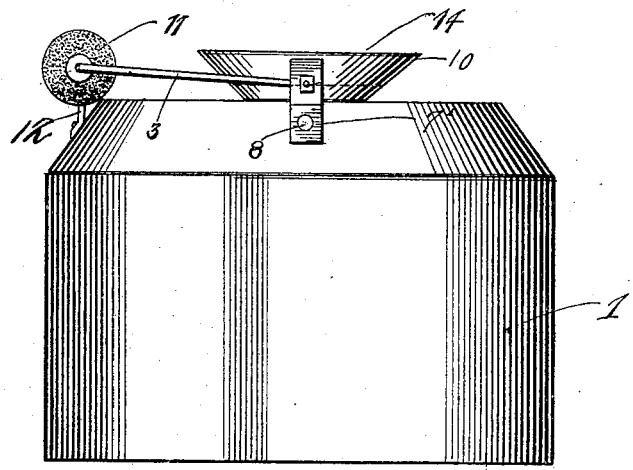

In the accompanying drawings,—Figure 1 is a side view of a kettle fully and clearly illustrating my invention and showing the bail in an erect position. Fig. 2 is a rear view of Fig. 1, with the bail in horizontal position.

Referring to the several parts by reference numerals, 1 denotes a kettle or any other vessel to which it may be desired to apply my invention. The kettle is provided with the ordinary spout 2, said spout extending a height slightly above the top of the kettle, such construction preventing the sudden spurts of hot water coming from the kettle when it is full and thus lessening the danger of the person handling the same being scalded. The bail 3 is pivotally mounted on relatively spaced ears 5 and 6. The said ears comprise a body portion 4, offset flanges 7 and 7' for the purpose of securing the ears to the top and sides of the kettle, and relatively spaced bodies or spring jaws 5' and 6'. The thickness of the bail 3 is of a greater width than the space between the spring jaws 5' and 6', thereby making it necessary to force the bail between the said spring jaws. After such action the bail will be securely held in an erect position while in use. The tension of the said ears is quickly regulated by means of a screw threaded bolt 9, passing through apertures formed in said ears, not shown, said bolt having a nut 10 engaging the threaded portion thereof. By such construction of the ears the bail will be held in an erect position, as shown in Fig. 1 of the drawings. The bail 3 is provided with a handle 11 made of asbestos, or other suitable material that will not radiate the heat. Said handle is of a tapering construction, such construction facilitating the person using the kettle to get a better grip in the right place when pouring water from the kettle. To the side of the kettle and adjacent the top and front edges is a catch 12 provided with a head 13, said head being adapted to hold the bail down on the kettle, if desired.

The kettle 1 has formed in the top adjacent the front and side edges a funnel-shaped filling opening 14, said opening being so arranged that when a kettle is taken off of the stove to a faucet or to a water pail to fill, the handle 11 is not directly over the spout 14, and by such construction the person using the same will be less liable to burn the hand with the escaping steam, after the cover 16 has been removed therefrom, as shown in dotted lines in Fig. 1.

From the foregoing description, taken in connection with the accompanying drawings, the advantages of the construction and method of operation will be readily understood to those skilled in the art to which the invention appertains and, while I have described the principle of the invention, I desire to have it understood that the device shown is merely illustrative, and that such changes may be made as are within the scope of the invention.

Having thus described the invention, what is claimed as new, is:—

1. A kettle including an ear comprising a pair of relatively spaced bodies, said bodies having portions extending inwardly relatively to each other to provide spring jaws, and a bail pivotally mounted on the bodies between the jaws, said jaws being adapted to engage and hold the bail in an erect position.

2. A kettle including an ear comprising a pair of relatively spaced bodies, said bodies having portions extending inwardly relatively to each other to provide spring jaws, flanges for securing said bodies to the kettle, and a bail pivotally mounted on the bodies between the jaws, said jaws being adapted to engage and hold the bail in an erect position.

In testimony whereof I affix my signature in presence of two witnesses.

ROBERT B. LEWIS.

Witnesses:
 W. Breisch,
 J. D. Feicht.